Patented Mar. 14, 1950

2,500,155

UNITED STATES PATENT OFFICE 2,500,155

PREPARATION OF ESTERS OF CYCLIC ACETALACETIC ACIDS

Willard J. Croxall, Bryn Athyn, and John O. Van Hook, Philadelphia, Pa., assignors to Rohm & Haas Company, Philadelphia, Pa., a corporation of Delaware No Drawing. Application October 2, 1948, Serial No. 52,606

12 Claims. (Cl. 260—338)

This invention deals with esters of cyclic acetalacetic acids and with a method for the preparation of these esters.

The esters prepared according to the method of this invention have the structure

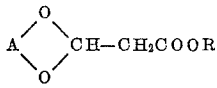

wherein A is a divalent group having a saturated chain of two to three carbon atoms between the two cyclic ether atoms to which this chain is attached and R is a non-tertiary hydrocarbon group, particularly a lower alkyl group, i. e., an alkyl group of one to four carbon atoms.

These esters are prepared by heating together in the presence of an acidic condensing agent (a) a polyhydric alcohol which has two to three carbon atoms between a pair of hydroxyl groups and (b) a β,β-diether propionate or a β-ether acrylate. The ether substituent of the propionate or acrylate is displaced with formation of a cyclic acetalacetate. When two carbon atoms are present between a pair of hydroxyl groups in the starting polyhydric alcohol, there are obtained esters of 1,3-dioxolane-2-acetic acid. When three carbon atoms are present between a pair of hydroxyl groups in the polyhydric alcohol, there result esters of 2-m-dioxaneacetic acid.

The β,β-diether propionates and β-ether acrylates have the respective formulas

and

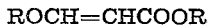

These may be summarized by the formula $(RO)_nCHCH_nCOOR$, where $n$ is an integer from one to two. The acrylate is derivable from the propionate by heating the latter with an anhydrous, strongly alkaline catalyst or an acidic catalyst and separating a mole of the alcohol ROH per mole of starting ester. Temperatures for heating to effect this change vary from 80° to 250° C. and are preferably 100° to 220° C. Details of the conversion of ether propionate to ether acrylate are given in application Serial No. 52,608, filed by Croxall and Schneider on even date.

It is sometimes a convenience to effect this change in order to remove a mole of the alcohol ROH before undertaking the reaction with a polyhydric alcohol. Yet, it is not essential, for the β,β-diether propionates may be used directly. There may likewise be used mixtures of diether propionate and ether acrylate, such as result in the synthesis of these materials, as will be described.

Esters of the formula $(RO)_2CHCH_2COOR$ and also $ROCH=CHCOOR$ are obtained by reacting acetylene with esters of carbonic acid and of non-tertiary alcohols in the presence of an anhydrous, strongly alkaline catalyst. As catalyst there may be used an alkali metal acetylide, an alkali metal alcoholate, or a quaternary ammonium alcoholate, such as sodium or potassium acetylide, sodium methylate, potassium ethylate, sodium butoxide, benzyl trimethyl ammonium methylate, or dibenzyl dimethyl ammonium tert.-butoxide. The reaction is effected at 20° to 110° C. In the usual procedure, acetylene is run into a mixture of carbonate ester and catalyst; the catalyst is then destroyed; and the products are separated, generally by distillation. The first fractions contain alcohol and unreacted carbonate ester. There is then obtained under the usual conditions a fraction which is mostly a β,β-diether propionate mixed with some β-ether acrylate. While these two types of esters are separable on careful redistillation, such a step is unnecessary, at least insofar as a starting material for the present invention is concerned. The β-ether acrylates undergo a reaction which is comparable to that of the β,β-diether propionates and yield the same end product when reacted with the polyols as herein described.

Complete details of carrying out the reaction between acetylene and esters of carbonic acid are given in application Serial No. 52,607, filed by Croxall and Schneider on even date. As there described, any ester of the formula $(RO)_2CO$ may be used where R is free of acidic hydrogen or groups which react with the alkaline catalysts. Thus, R may be a hydrocarbon group, including aliphatic, cycloaliphatic, or arylaliphatic hydrocarbon group, which is saturated or unsaturated. R may also be an ether- or thioether-containing group. In general, R is the non-hydroxylated residue of a non-tertiary monohydric alcohol, ROH, and is free of a substituent reacting with an alkali.

For purposes of the present invention, however, the alcohol ROH should boil below the polyhydric alcohol used as a reactant in the process of this invention. This permits the ready replacement of the RO— group of the ether propionates or acrylates and removal through volatilization. Furthermore, it is desirable that the alcohol to be removed be of small molecular size on the basis of practical and economic considerations.

Hence, the preferred diether propionates and ether acrylates are those in which R is a methyl, ethyl, propyl, or butyl group. Larger R groups are of interest only when a large R group is needed in the ester portion of the product. When R is the residue of an alcohol, ROH, boiling above about 140° C., it is desirable to avoid acyclic β,γ-unsaturation, as secondary reactions occur with β,γ-unsaturation at high temperatures. With such unsaturation, transetherification should be effected below 150° C.

The preparation of ether esters from acetylene and carbonate is illustrated with the following specific example.

There was placed in a five hundred cc. flask equipped with a gas-tight stirrer 117 grams of a 19% solution of benzyl trimethyl ammonium ethoxide in ethanol. Excess ethanol was distilled therefrom under reduced pressure, leaving the monoethylate of benzyl trimethyl ammonium ethoxide as a syrupy liquid. Thereto were added with stirring and cooling 169 grams of diethyl carbonate and twenty grams of ethyl β-ethoxyacrylate. This latter substance serves as an accelerator in the reaction.

The reaction flask was then equipped with a gas inlet tube and an outlet tube. After the apparatus had been flushed with nitrogen, acetylene was pressed in under ten inches of mercury pressure. The temperature of the reaction mixture rose rapidly to 45° C., and it was necessary to supply intermittent cooling to hold the temperature at about this level. In about an hour, absorption of acetylene became slow. The reactor was then cooled to room temperature. The alkaline catalyst was destroyed by careful addition of dilute acetic acid. Two layers formed. The upper, oily layer was separated and distilled.

There was first obtained a forerun of ethanol and diethyl carbonate. There was then obtained at 55° to 75° C./1-4 mm. a fraction which consisted of 90% of ethyl β,β-diethoxypropionate and 10% of ethyl β-ethoxyacrylate. There was then taken off at 75° C./4 mm. a fraction of pure ethyl β,β-diethoxypropionate. Both of these fractions are useful in the process of this invention. The fraction containing the mixture may be refractionated to separate the two esters, but this is not essential. The β-ethoxyacrylate may be converted to ethyl β,β-diethoxypropionate by addition of ethyl alcohol in the presence of a catalyst, or the ethyl β,β-diethoxypropionate may be dealcoholated by distilling ethyl alcohol therefrom in the presence of a catalyst.

In place of the benzyl trimethyl ammonium ethoxide used above as a catalyst, there may be taken other quaternary ammonium alkoxides, such as tetramethyl ammonium methoxide, trimethyl benzyl ammonium methoxide, dibenzyl dimethyl ammonium propoxide, benzyl trimethyl ammonium tert.-butoxide, or other alkoxide which does not readily decompose to give olefins when heated. Alternatively, there may be used an alkali metal alkoxide, such as sodium methoxide, sodium butoxide, or potassium hexoxide. Alkali metal acetylides are also effective catalysts.

By methods such as described, there may be prepared a wide variety of ether propionates and acrylates. Typical examples of these are methyl β,β-dimethoxypropionate, ethyl β,β-diethoxypropionate, propyl β,β-dipropoxypropionate, isopropyl β,β-diisopropoxypropionate, butyl β,β-dibutoxypropionate, hexyl β,β-dihexoxypropionate, 2-ethylhexyl β,β-di(2-ethylhexoxy)propionate, octyl β,β-dioctoxypropionate, cyclohexyl β,β-dicyclohexoxypropionate, methylcyclohexyl β,β-di(methylcyclohexoxy)propionate, benzyl β,β-dibenzoxypropionate, and the like. Corresponding ether acrylates are, for example, ethyl β-ethoxyacrylate, propyl β-propoxyacrylate, butyl β-butoxyacrylate, hexyl β-hexoxyacrylate, cyclohexyl β-cyclohexoxyacrylate, etc. These ether propionates and acrylates are useful as starting materials in the process of the invention here claimed.

As the second kind of reactant for the process of this invention—the formation of the cyclic acetalacetates—there may be used polyhydric alcohols. These must have at least two alcoholic hydroxyl groups which are separated from each other by two to three carbon atoms in an open chain or by two carbon atoms which are part of a cycle. The polyhydric alcohols are not limited to dihydric alcohols but may be any polyhydric alcohol in which at least one pair of hydroxyl groups occurs in the above-prescribed relationship. Polyhydric alcohols may be used in which other functional groups than hydroxyl occur such as halogen, as found, for example, in a halohydrin with at least two properly spaced hydroxyl groups. The polyhydric alcohol may similarly contain a nitro group. Furthermore, one or more hydroxyl groups may be esterified with a monobasic carboxylic acid or etherified with an alcohol residue so long as two properly spaced alcoholic hydroxyl groups remain.

The simplest polyhydric alcohols which may be used are ethylene glycol and trimethylene glycol, but there may be used any of the hydrocarbon-substituted derivatives thereof, particularly glycols containing as many as twelve carbon atoms. Typical of such glycols are propylene glycol, 1,2-butanediol, 1,3-butanediol, 2-methyl-1,3-propanediol, 2,2-dimethyl-1,3-propanediol, 2,3-dimethyl-1,3-butanediol, 2-methyl-1,3-pentanediol, 2-methyl-2,3-pentanediol, 2-ethyl-1,3-pentanediol, 2,4-dimethyl-1,3-pentanediol, 2,2-diethyl-1,3-propanediol, 2 - isopropyl-2 - methyl - 1,3-propanediol, 2-isobutyl-2-methyl-1,3-propanediol, 2-tert.-butyl-2-methyl-1,3-propanediol, 2-ethyl-1,3-hexanediol, 2-isopropyl-1,3-pentanediol, 2-ethyl - 4 - methyl-1,3-pentanediol, 2,5-dimethyl-1,3-hexanediol, 2-methyl-1,3-octanediol, 2-ethyl-1,3-heptanediol, 2-amyl-2-ethyl-1,3-propanediol, 2-hexyl-2-methyl-1,3-propanediol, phenyl - 1,2 - dihydroxyethane, 1-phenyl - 1,2 - dihydroxypropane, 1 - cyclohexyl - 1,2 - dihydroxypropane, 1-phenyl-1,3-dihydroxypropane, 1-phenyl - 2,3-dihydroxypropane, and the like.

There may also be used as starting materials polyhydric alcohols which have more than two alcoholic hydroxyl groups. Typical of such acyclic alcohols are glycerine, α-methyl glycerine, erythritol, pentaerythritol, mannitol, sorbitol, and the like. These all possess at least one pair of alcoholic hydroxyl groups so spaced as to form a cycle when reacted with the diether propionates or ether acrylates.

With such polyhydric alcohols, a halogen may replace a hydroxyl group. The halohydrins resulting form an interesting subclass of starting materials. Typical of these are α-chloroglycerylhydrin, α-bromoglycerylhydrin, β-chloroglycerylhydrin, β-bromoglyceryhydrin, and the like.

Examples of nitro-substituted polyhydric alcohols are 2-nitro-1,3-propanediol and 2-methyl-2-nitro-1,3-propanediol.

There may likewise be used ethers and esters of polyhydric alcohols, typified by α-methyl glyceryl ether, α-acetyl glycerine, α-butyryl glycerine, etc. Other glyceryl ethers which may be used are the α-ethyl, α-propyl, α-isopropyl, α-butyl, α-amyl, α-phenyl, α-tolyl, α-butylphenyl, α-benzyl, α-cyclohexyl, β-methyl, β-ethyl, β-phenyl, methoxyethyl, etc. Similar ethers of pentaerythritol, sorbitol, and mannitol may be taken, particularly those having a hydrocarbon O-substituent of one to ten carbon atoms. Similarly, derivatives having acyl substituents from monobasic carboxylic acids, such as acetic, propionic, butyric, hexoic, 2-ethylhexoic, etc., may be used. Examples of these are sorbitol monoacetate, mannitol monobutyrate, and sorbitol monohexoate.

As a cyclic polyhydric alcohol, there may be used 1,2-cyclohexanediol and its alkylated derivatives, such as 1,2-methylcyclohexanediol.

The polyhydric alcohols which are reactive are summarized by the formula $R''(OH)_x$ wherein $x$ is an integer from two to six, inclusive, and $R''$ is the residue thereof containing a saturated chain of two to three carbon atoms between a pair of hydroxyl groups thereof. $R''$ is commonly a hydrocarbon group. It may also be a halohydrocarbon, a nitrohydrocarbon, an ether-containing group, an ester-containing group, or other non-basic group. In a preferred form of this invention, $R''$ is an alkylene group having a chain of two to three carbon atoms between hydroxyl groups with not over twelve carbon atoms in the entire hydrocarbon group.

The catalysts for effecting the transetherification here involved for formation of cyclic acetalacetates are the acidic condensing agents. One subclass of such catalysts is composed of alkali metal acid sulfates, typified by potassium hydrogen sulfate and sodium hydrogen sulfate. Another subclass consists of Friedel-Crafts catalysts such as the anhydrous chlorides and bromides of aluminum and zinc. Closely related thereto are boron trifluoride and its coordination complexes with oxygenated organic compounds.

The boron trifluoride catalysts form a subclass of considerable interest. Complexes are formed with boron trifluoride and alcohols, aldehydes, carboxylic acids, esters, ketones, ethers, and the like. Typical complexes are $$BF_3 \cdot 2CH_3CHO$$
$$BF_3 \cdot 2C_3H_7CHO$$
$$BF_3 \cdot 2CH_3COOH$$
$$BF_3 \cdot CH_3COOC_2H_5$$
$$BF_3 \cdot (CH_3)_2CO$$
$$BF_3 \cdot CH_3OH$$
$$BF_3 \cdot C_2H_5OH$$
$$BF_3 \cdot C_4H_9OH$$
$$BF_3 \cdot C_2H_5OC_2H_5$$
$$BF_3 \cdot (C_4H_9)_2O$$

etc.

Free acids, such as sulfuric acid, phosphoric acid, and sulfonic acids such as p-toluene sulfonic acid, compose yet another subclass of catalysts.

The proportion of catalyst used is small and may conveniently vary from 0.01% to about 1% of the weight of reactants. While more than 1% may be used, it is generally not necessary.

The temperature of the reaction between polyhydric alcohol and ether propionate or acrylate may be varied from 75° to 250° C. It may be in part determined by the choice of reactants and the boiling points of the alcohols involved or of a solvent, if used.

It is sometimes desirable to use an inert organic solvent, such as a hydrocarbon or chlorinated hydrocarbon. Such solvent may be refluxed to control the temperature and to assist in removal of the alcohol, ROH, which is evolved in the transetherification reaction.

About one mole of a glycol may be taken per mole of ether acrylate or diether propionate. With other polyhydric alcohols, the ratio will be determined by the number of pairs of hydroxyl groups to be reacted.

In the reaction with a pair of hydroxyl groups when about two moles of alcohol, ROH, per mole of ether propionate have been evolved or one mole of such alcohol per mole of ether acrylate has been evolved, the reaction may be interrupted and the catalyst destroyed by neutralization or by washing. The products are then worked up.

The acetalacetates obtained are for the most part liquids which have good solubility relationships, fitting them for use as softeners and plasticizers. They are also useful as chemical intermediates. They may also be reacted to form resins.

The reactions involved may be illustrated with ethylene glycol and ethyl β,β-diethoxypropionate or β-ethoxyacrylate, thus:

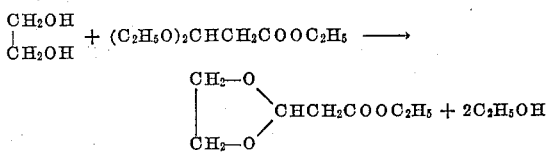

and

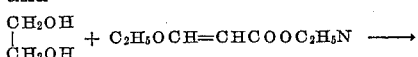

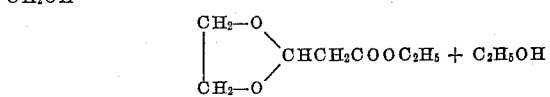

These examples are typical of reactions in which the polyhydric alcohol has two carbon atoms between a pair of hydroxyl groups.

The reaction with trimethylene glycol and methyl β,β-dimethoxypropionate is illustrative of reactions which depend upon a polyhydric alcohol having three carbon atoms between a pair of hydroxyl groups. It may be represented:

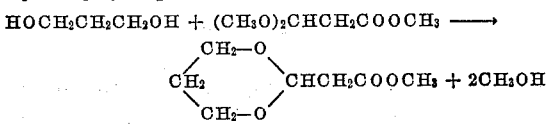

A β-alkoxyacrylate likewise yields a 2-m-dioxane-acetate, thus:

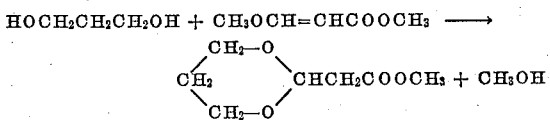

Polyhydric alcohols in which the hydroxyl groups are separated by more than three carbon atoms tend to give resinous materials and hydroxy ethers.

The following examples give additional details of the preparation of esters of cyclic acetalacetic acids.

Example 1

A mixture of 190 grams of ethyl β,β-diethoxypropionate (one mole), sixty-two grams of ethylene glycol (one mole), and 0.1 gram of sodium hydrogen sulfate was heated in a reaction vessel to about 120° C. Ethyl alcohol was formed, volatilized, and taken off at vapor temperatures of 78°–81° C. As the reaction proceeded, the temperature of the reaction mixture increased to 206° C. When ethyl alcohol was no longer evolved, the mixture was subjected to distillation under reduced pressure. There was obtained as a forerun a mixture amounting to seventeen grams of ethylene glycol, ethyl β-ethoxyacrylate, and a material which on refractionation of the forerun distilled at 60°–72° C./3 mm. The main fraction distilled at 72°–74° C./3 mm. and consisted of 130 grams of ethyl 1,3-dioxolane-2-acetate. This may also be called 2-carbethoxymethyldioxolane and has the formula

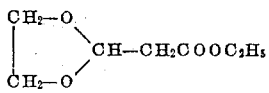

It had a refractive index, $n_D^{20}$, of 1.4331 and a density, $d_{20}^{20}$, of 1.1268. The fraction as obtained gave the following analytical data: Saponification equivalent, 160; carbon, 52.48%, and hydrogen, 7.56%. These may be compared with theoretical values for $C_7H_{12}O_4$: Saponification equivalent, 159; carbon, 52.00%, and hydrogen, 7.01%.

In place of ethyl β,β-diethoxypropionate, there may be used the comparable esters, methyl β,β-dimethoxypropionate, propyl β,β-dipropoxypropionate, butyl di-butoxypropionate, or the like, to give methyl, propyl, butyl, or the like, 1,3-dioxolane-2-acetates.

Example 2

A mixture of 190 grams of ethyl β,β-diethoxypropionate, seventy-six grams of freshly distilled propylene glycol (1,2-propanediol), and one gram of sodium acid sulfate was heated in a reaction vessel. When the temperature of this mixture reached 124° C., ethyl alcohol was evolved and distilled therefrom at vapor temperatures of 78°–81° C. The temperature of the reaction was slowly increased to 202° C. The reaction mixture was then subjected to reduced pressure. Between 45° C./0.45 mm. and 70° C./0.2 mm., there was taken off twenty-seven grams of propylene glycol. At 70° C./0.2 mm. to 73° C./0.23 mm., a fraction of 101 grams was taken off which corresponded in composition to that of ethyl 4-methyl-1,3-dioxolane-2-acetate,

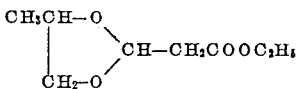

which may also be named 2-carbethoxymethyldioxolane. This material had an index of refraction, $n_D^{20}$, of 1.4304 and gave the following data upon analysis: Saponification equivalent, 172; carbon, 55.51%; hydrogen, 8.26%. Corresponding theoretical values for $C_8H_{14}O_4$ are 174, 55.17%, and 8.05%, respectively. Upon further fractionation, there was obtained at 73° C./0.23 mm. to 95° C./0.24 mm. a distillate of twenty-two grams which had an index of refraction, $n_D^{20}$, of 1.4350 and was chiefly ethyl 4-methyl-1,3-dioxolane-2-acetate.

Example 3

A mixture of 380 grams of ethyl β,β-diethoxypropionate, 184 grams of freshly distilled glycerine, and two grams of sodium acid sulfate was heated in a reaction vessel to about 180° C. Ethanol was evolved and taken off with over-head temperatures of 80° to 84° and pot temperatures of 184° to 241° C. In all, 176 grams of ethanol was collected, while theory for the above mixture is 184 grams. Distillation was continued under reduced pressure, with a small amount of glycerine being taken off together with some ethyl ethoxyacrylate and some ethyl 4-hydroxymethyl-1,3-dioxolane-2-acetate. Between 116° C. and 119° C./0.12 mm., there were obtained 276 grams of distillate having a refractive index, $n_D^{20}$, of 1.4550, having a saponification equivalent of 186.4 and a hydroxyl equivalent of 174.6, containing 50.10% of carbon and 7.47% of hydrogen, and corresponding in composition to that of ethyl 4-hydroxymethyl-1,3-dioxolane-2-acetate. The theoretical values for this compound are: Saponification and hydroxyl equivalents, 190; carbon content, 50.53%, and hydrogen content, 7.37%. By a conventional test with hydrochloric acid-zinc chloride mixture, the absence of a secondary or tertiary alcohol was shown. The hydroxymethyl group was thus in the 4-position.

A further fraction of forty-one grams, obtained at 119° to 129° C./0.12 mm., consisted chiefly of the same ester, which may also be named 2-carbethoxymethyl-4-hydroxymethyl-1,3-dioxolane, having the structure

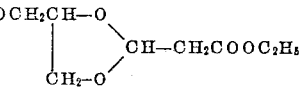

Example 4

A mixture of 190 grams of ethyl β,β-diethoxypropionate, 110.5 grams of glyceryl α-monochlorohydrin, and one gram of sodium hydrogen sulfate was heated in a reaction vessel. At 110° C., ethanol began to be evolved with an overhead temperature of 75° C. The reaction mixture was gradually heated to a pot temperature of 195° C. with overhead temperatures up to 82° C., while 77.2 grams of ethanol was collected. The mixture was then heated under reduced pressure. A forerun of fifteen grams was collected, consisting of glyceryl α-chlorohydrin, ethyl β-ethoxyacrylate, and a small amount of the expected product. This forerun was collected at 31° C./0.95 mm. to 81° C./0.2 mm. There was then obtained a main fraction of 169 grams, distilling at 81°–99° C./0.20 mm. On redistillation, this fraction distilled at 90° C./0.3 mm. to 85° C./0.1 mm. It had an index of refraction, $n_D^{20}$, of 1.4560. It contained 46.31% of carbon, 6.35% of hydrogen, and 16.48% of chlorine, compared to calculated values for $C_8H_{13}O_4Cl$ of 46.04%, 6.23%, and 17.03%, respectively. The product is thus ethyl 4-chloromethyl-1,3-dioxolane-2-acetate,

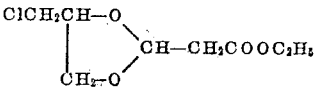

or 2-carbethoxymethyl-4-chloromethyl-1,3-dioxolane.

In place of glyceryl α-chlorohydrin, there may be used glyceryl β-chlorohydrin. The product in this case, however, is ethyl 5-chloro-2-m-dioxolaneacetate.

Example 5

A mixture of 190 grams of ethyl β,β-diethoxypropionate, seventy-six grams of trimethylene glycol, $HOCH_2CH_2CH_2OH$, and one gram of sodium hydrogen sulfate was heated in a reaction vessel. At a pot temperature of about 158° C., ethanol began to be evolved. Pot temperatures increased gradually to 204° C. while overhead temperatures increased from 75° C. to 82° C. as ethanol was taken off. The reaction mixture was then subjected to reduced pressure. After a small forerun, a fraction of twenty-eight grams, distilling between 56° C./0.20 mm. and 72° C./0.06 mm., was taken off having a refractive index of 1.4421. This consisted essentially of ethyl 2-m-dioxaneacetate. A main fraction of ninety-five grams was then obtained at 72° C./0.06 mm. to 80° C./0.10 mm. This was ethyl 2-m-dioxaneacetate. It had a refractive index, $n_D^{20}$, of 1.4420. A third fraction of twenty-six grams distilled at 80° C./0.1 mm. to 86° C./0.40 mm. and had a refractive index of 1.4420, also corresponding in composition to that of the desired ethyl 2-m-dioxaneacetate. Analysis of the product gave the following data: Saponification equivalent, 172.7; carbon, 55.05%; and hydrogen, 7.98%. Theoretical values are 173.7, 55.17%, and 8.05%, respectively. The structure of the product is

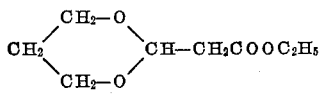

An alternative name for this compound is 2-carbethoxymethyl-1,3-dioxane.

*Example 6*

A mixture of ninety-five grams of ethyl β,β-diethoxypropionate, fifty-nine grams of freshly distilled "hexylene glycol," 2-methyl-2,4-pentanediol, and one gram of sodium hydrogen sulfate was heated in a reaction vessel. With pot temperatures of 162°–173° C., there was obtained forty-five grams of ethyl alcohol. The reaction mixture was then heated under reduced pressure. A fraction of fourteen grams was obtained between 37° C./1.2 mm. and 74° C./0.25 mm., consisting of hexylene glycol, ethyl β-ethoxyacrylate, and some of the desired product. The main fraction was taken off at 74° C./0.25 mm. to 76° C./0.14 mm. It amounted to fifty-eight grams; it had a refractive index, $n_D^{20}$, of 1.4370; and it gave a saponification equivalent of 208 (theory is 216 for $C_{11}H_{20}O_4$). Another fraction was taken off between 76° C./0.14 mm. and 82° C./0.20 mm., amounting to twenty-seven grams and having a refractive index of 1.4379. These two fractions represent a yield of over 78% of ethyl 4,4,6-trimethyl-2-m-dioxaneacetate,

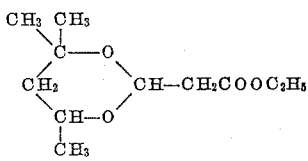

which may also be termed 2-carbethoxymethyl-4,4,6-trimethyl-1,3-dioxane. Analysis of the product showed a carbon content of 61.14% (theory, 61.11%), a hydrogen content of 9.46% (theory, 9.26%), and a saponification equivalent of 208 (theory, 216).

*Example 7*

A mixture of 101 grams of ethyl β,β-diethoxypropionate, eighty-five grams of 2-butyl-2-ethyl-1,3-propanediol, and one gram of sodium hydrogen sulfate was heated in a reaction vessel. At a pot temperature of 166° C., ethanol began to be evolved and, with pot temperatures increasing to 214° C. and with overhead temperatures of 79° C. to 85° C., forty-two grams of ethanol was collected. The reaction mixture was then subjected to reduced pressure. A mixture amounting to nine grams was distilled between 49° C./1.1 mm. and 116° C./0.4 mm. and was found to consist of 2-butyl-2-ethyl-1,3-propanediol, ethyl β-ethoxyacrylate, and butyl 5-butyl-5-ethyl-2-m-dioxaneacetate. There was then obtained a main fraction of 129 grams, distilling at 126°–129° C./0.4 mm., having a refractive index, $n_D^{20}$, of 1.4500, and corresponding in composition to that of ethyl 5-butyl-5-ethyl-2-m-dioxaneacetate, having a carbon content of 65.19% (theory, 65.12%), a hydrogen content of 10.13% (theory, 10.08%), and a saponification equivalent of 256.3 (theory, 258).

This product has the structure

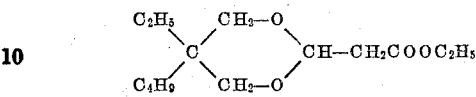

When methyl β,β-dimethoxypropionate is substituted for the above ethyl β,β-diethoxypropionate, there is obtained methyl 5-butyl-5-ethyl-2-m-dioxaneacetate. Butyl β,β-dibutoxypropionate gives the corresponding butyl ester, butyl 5-butyl-5-ethyl-2-m-dioxaneacetate.

In place of the 1,3-propanediol used above, there may be used other 1,3-propanediols which contain hydrocarbon groups as above or which contain other substituents which are unaffected by the acidic catalysts, such as halogens or the nitro group. Thus, 2-methyl-2-nitro-1,3-propanediol yields with ethyl β,β-diethoxypropionate ethyl 5-methyl-5-nitro-2-m-dioxaneacetate.

*Example 8*

A mixture of seventy-four grams of pure methyl β,β-dimethoxypropionate (refractive index, $n_D^{20}$, of 1.4104), thirty-one grams of freshly distilled ethylene glycol, and 0.1 gram of sodium acid sulfate was heated in a reaction vessel carrying a packed column. When the temperature of the mixture reached about 98° C., there evolved methyl alcohol, which was taken off through the column. The temperature of the reaction mixture was steadily increased until 180° C. was reached. Up to this point, twenty-eight grams of methyl alcohol had been collected. The theoretical amount of methyl alcohol available is thirty-two grams. The batch was then distilled through the packed column. After a forerun, amounting to 14.4 grams and containing chiefly methyl 1,3-dioxolane-2-acetate, was taken off at 29° C./0.5 mm. to 62° C./0.15 mm., a main fraction of thirty-four grams was collected at 62° C./0.15 mm. to 58° C./0.15 mm. There was also separated another fraction which came over at 58° C./0.15 mm. to 0.60 mm. These fractions had refractive indices, $n_D^{20}$, of 1.4337 and 1.4338, respectively. They had a saponification equivalent of 147 (theory for $C_6H_{10}O_4$ is 146). They corresponded in composition with that of methyl 1,3-dioxolane-2-acetate, the carbon analysis being 49.25% (theory, 49.31%) and the hydrogen analysis being 6.93% (theory, 6.85%). The yield of the product was 95.5%.

*Example 9*

There were mixed in a reaction vessel 82.2 grams of butyl β,β-dibutoxypropionate, 18.6 grams of freshly distilled ethylene glycol, and 0.1 gram of sodium acid sulfate. The mixture was heated and butyl alcohol evolved at vapor temperatures of 117°–125° C. with pot temperatures of 150° to 193° C. After 42.5 grams of butyl alcohol had been obtained, the reaction was continued under reduced pressure. A first fraction of 13.5 grams was taken off at 65° C./0.25 mm. to 90° C./0.20 mm. It had an index of refraction of 1.4352 at 20° C. and was composed chiefly of butyl 1,3-dioxolane-2-acetate. A second fraction, amounting to twenty-eight grams, was taken off at 90° C./0.20 mm. to 88° C./0.14 mm. This fraction had a refractive index, $n_D^{20}$, of 1.4360 and was butyl 1,3-dioxolane-2-acetate. It had a saponification equivalent of 187.4 (theory is 188 for $C_9H_{16}O_4$). It contained by analysis 57.75% of carbon and 8.81% of hydrogen (theoretical values are 57.45% and 8.51%, respectively). A third fraction was taken off at 88° C./0.14 mm. to 85° C./0.30 mm. It had a refractive index of 1.4370 and otherwise conformed to butyl 1,3-dioxolane-2-acetate. The total yield of this product was 98.4%.

In the above examples, the catalyst has been an alkali metal acid sulfate, specifically sodium acid sulfate. Potassium acid sulfate may be used in the same way and with the same end results. In place of the acid sulfate catalysts, there may be used other acidic catalysts to promote the transetherification reaction here involved. The use of these is illustrated in the following examples.

Example 10

A mixture of ninety-five grams of ethyl β,β-diethoxypropionate, thirty-one grams of freshly distilled ethylene glycol, and one milliliter of boron trifluoride-ethyl ether catalyst was heated in a reaction vessel equipped with a packed column. There evolved forty-two grams of ethyl alcohol at vapor temperatures of 74° to 81° C. with pot temperatures from 95° to 155° C. Distillation through the column was then continued at reduced pressures. A forerun of six grams was obtained at 50° C. to 61° C./0.4 mm. It consisted of ethyl acrylate, ethylene glycol, and ethyl 1,3-dioxolane-2-acetate. A main fraction, amounting to 47.5 grams, was then taken off at 61 C./0.4 mm. to 0.5 mm. It had an index of refraction, $n_D^{20}$, of 1.4330 and a saponification equivalent of 162 (theory, 160). This fraction was ethyl 1,3-dioxolane-2-acetate. Upon continued distillation at 58° C./0.15–0.60 mm., another fraction was obtained which was chiefly ethyl 1,3-dioxolane-2-acetate. This fraction had a refractive index of 1.4321. The yield of the desired product was over 65%.

Example 11

The procedure of Example 10 was followed with substitution of one gram of anhydrous aluminum chloride for the boron trifluoride catalyst. With vapor temperatures of 78° to 80° C., there was distilled from the reaction vessel forty-two grams of ethyl alcohol while the pot temperature increased from 96° to 195° C. Upon continuation of the distillation at reduced pressure, there was obtained a forerun of fourteen grams containing ethyl acrylate, ethylene glycol, and ethyl 1,3-dioxolone-2-acetate. There was then obtained at 74°–76° C./1 mm. a fraction of fifty-two grams, which corresponded in composition to ethyl 1,3-dioxolane-2-acetate. The saponification equivalent determined was 160.2. The yield was 65%, based on this fraction.

The reaction here involved is not confined to polyol compounds but is also effected with thiols, as is shown in the following example in which a hydroxyl group is replaced by a thiol group. A cyclic acetalacetate is likewise obtained.

Example 12

A mixture of 190 grams of ethyl β,β-diethoxypropionate, seventy-eight grams of β-mercaptoethanol, and 0.1 gram of sodium acid sulfate was heated in a reaction vessel equipped with a packed distillation column. When the temperature of the reacting mixture was above 100° C., there was taken off ninety-four grams of ethanol at a vapor temperature of 78° C. The pot temperature was carried to 190° C. and the system was then reduced in pressure. A main fraction of sixty-eight grams was taken off at 78°–81° C./1 mm. It had a refractive index of 1.4838, a molecular refraction, $DR_D$, of 43.60, and a density, $d_{20}^{20}$, of 1.181. Upon analysis, it gave a saponification equivalent of 171 and was found to contain 48.07% of carbon and 6.83% of hydrogen. Theoretical values for $C_7H_{12}O_3S$ are: Saponification equivalent, 176; carbon content, 47.70%; hydrogen content, 6.86%; and molecular refraction, $MR_D$, 43.58. The product was thus ethyl 1-thio-3-oxolane-2-acetate in a yield of 39%.

When the reaction was repeated in the presence of toluene as a solvent and run at reflux temperatures, the yield of ethyl 1-thio-3-oxolane-2-acetate was 43%.

As stated above, the reaction is not confined to dihydric alcohols but may be accomplished with polyols having more than two hydroxyl (or thiol) groups separated by a chain of two to three carbon atoms. An example with a trihydric alcohol is given above (Example 3). There the proportions were chosen for the reaction of two hydroxyl groups. Similar proportions may be used with such polyols as pentaerythritol, sorbitol, or mannitol. On the other hand, one molecular proportion of ether propionate (or acrylate) may be used for each pair of hydroxyl groups in such polyols to give polycyclic products. A typical example illustrating this situation follows.

Example 13

In a reaction vessel equipped with a packed reflux and distillation column, there were placed 190 grams of ethyl β,β-diethoxypropionate, sixty-eight grams of pentaerythritol, and one gram of sodium hydrogen sulfate. There was taken off at pot temperatures of 139° to 165° C. and overhead temperatures from 80° to 96° C. about eighty-three grams of ethanol. The reaction mixture was then cooled. Crystals formed. These were dissolved in petroleum ether at 90° to 100° C. and recrystallized. There were obtained 158.5 grams of white crystals which melted at 73°–75° C. A portion recrystallized from ethanol gave a melting point of 79° C. Recrystallization from petroleum ether and drying in vacuo gave crystals melting at 79° C. Analysis of the product gave the following data: Molecular weight, 320; saponification equivalent, 331.6; carbon content, 54.28%; and hydrogen content, 7.27%. These data agree with the values for $C_{15}H_{24}O_8$, which are: Molecular weight, 332; saponification equivalent, 332; carbon content, 54.22%; and hydrogen content, 7.23%. The compound is, therefore, a bicyclic derivative, 3,9 - di(carbethoxymethyl) - 2,4,8,10-tetroxaspiro-(5.5)-hendecane,

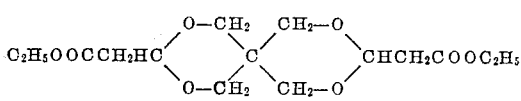

The reaction of polyols and β-ether acrylates is illustrated by the following three examples.

Example 14

To a mixture of seventy-two grams of ethyl β-ethoxyacrylate and thirty-one grams of freshly distilled ethylene glycol in a reaction vessel, there was added one cubic centimeter of boron trifluoride-ethyl ether catalyst. The mixture was then heated. At pot temperatures from 115° C. to 135° C., there was evolved ethyl alcohol, which was refluxed in a packed column and removed at overhead temperatures of 75° to 82° C. After twenty-one grams of ethyl alcohol had been collected, the system was subjected to reduced pressure. A fraction of six grams was taken off at 38° C./1.3 mm. to 61° C./0.25 mm. It was found to contain ethylene glycol, ethyl β-ethoxyacrylate, and some ethyl 1,3-dioxolane-2-acetate. A fraction of forty-two grams was then obtained at 61°–63° C./0.25 mm. It consisted of ethyl 1,3-dioxolane-2-acetate. This fraction had a refractive index of 1.4339 and a saponification equivalent of 164 (theory, 160). A third fraction was then taken off at 63° C./0.25 mm. to 60° C./0.45 mm., which consisted chiefly of ethyl 1,3-dioxolane-2-acetate.

*Example 15*

The procedure of Example 14 was repeated with substitution of 0.1 gram of sodium hydrogen sulfate for the previously used catalyst. From seventy-two grams of ethyl β-ethoxyacrylate and thirty-one grams of ethylene glycol, there was obtained twenty-two grams of ethyl alcohol with pot temperatures up to 200° C. Upon continuation of the distillation under reduced pressure, a fraction of 6.5 grams was obtained at 48° C./0.3 mm. to 60° C./0.2 mm., which consisted of ethylene glycol, β-ethoxyacrylate, and ethyl 1,3-dioxolane-2-acetate. A fraction of forty-three grams was then separated at 60°–64° C./0.2 mm. and another fraction of twenty-seven grams at 64° C./0.2 mm. These were ethyl 1,3-dioxolane-2-acetate.

*Example 16*

The procedure used in Examples 14 and 15 was followed with substitution of one gram of aluminum chloride for the catalysts above. After removal of twenty-one grams of ethyl alcohol at pot temperatures of 125°–165° C., distillation was performed under reduced pressure. Between 53° C./0.4 mm. and 67° C./0.2 mm., a forerun was collected, consisting of ethylene glycol, ethyl β-ethoxyacrylate, and ethyl 1,3-dioxolane-2-acetate. There was then collected forty-two grams of ethyl, 1,3-dioxolane-2-acetate, distilling at 67°–71° C./0.2–0.15 mm. This fraction had an index of refraction, $n_D^{20}$, of 1.4335 and a saponification number of 162.6. Another fraction was collected at 71°–78° C./0.15 mm.–0.21 mm., giving a total yield of product of 72.5%.

*Example 17*

There were mixed in a reaction vessel 33.8 grams (0.3 mole) of 1,2-cyclohexanediol, fifty-seven grams (0.3 mole) of ethyl β,β-diethoxypropionate, and 0.1 gram of sodium hydrogen sulfate. The mixture was heated to about 100° C. and ethyl alcohol was evolved at vapor temperatures of 78° to 82° C. The pot temperature was carried to about 175° C., by which time about twenty-two grams of alcohol had been collected. The reaction mixture was then placed under reduced pressure. A forerun of twenty-two grams was collected at 43°–97° C./0.2 mm. It consisted of unreacted 1,2-cyclohexanediol, ethyl β-ethoxyacrylate, and some 2-carboethoxymethyl-4,5,6,7-tetrahydrobenzodioxole. There was then collected a fraction at 97°–98° C./0.2 mm. consisting of this last-named substance. When this fraction was redistilled at 98° C./0.2 mm., the product obtained had a refractive index, $n_D^{20}$, of 1.4625 and a saponification equivalent of 202. By analysis, it contained 61.71% of carbon and 8.56% of hydrogen. Theoretical values for 2-carboethoxy-methyl-4,5,6,7-tetrahydrobenzodioxole are: Saponification equivalent, 214; carbon content, 61.68%; and hydrogen content, 8.41%.

*Example 18*

A mixture of ninety-five grams of ethyl β,β-diethoxypropionate, thirty-one grams of freshly distilled ethylene glycol, and one gram of p-toluene sulfonic acid was heated in a flask. When the temperature of the reaction mixture reached about 97° C., ethanol was evolved and taken off. As heating continued, the mixture reached a temperature of 150° C. while the vapor temperatures remained at 77° C. to 80° C. After thirty-seven grams of ethanol had been collected, the reaction was continued under reduced pressure. A fraction distilling at 55° C./1.1 mm. to 72° C./0.75 mm., having a refractive index, $n_D^{20}$, of 1.4428, amounted to seven grams and was composed of ethyl β-ethoxyacrylate. There was then obtained at 72° C./0.75 mm. to 73° C./0.95 mm. a fraction of twenty-seven grams, which was found to consist of 24% of ethyl β-ethoxyacrylate and 76% of ethyl 1,3-dioxolane-2-acetate. The next fraction, distilling at 73° C./0.95 mm.–1.2 mm. and amounting to thirty-one grams, consisted of ethyl 1,3-dioxolane-2-acetate. The yield of this product amounted to 64.4%.

*Example 19*

The procedure of Example 18 was repeated with substitution of one cubic centimeter of concentrated sulfuric acid for the p-toluene sulfonic acid. The ethanol was taken off at pot temperatures of 98° to 150° C. and overhead temperatures of 80° to 84° C. A fraction obtained at 67° C./1.5 mm. to 69° C./0.6 mm., amounting to fifteen grams, consisted of 37% of ethyl β-ethoxyacrylate and 63% of ethyl 1,3-dioxolane-2-acetate or 2-carbethoxymethyldioxolane. A fraction of thirty-eight grams was then obtained at 69° C.–73° C./0.6 mm. It consisted of 12% of ethyl β-ethoxyacrylate and 88% of ethyl 1,3-dioxolane-2-acetate. Refractionation of these distillation cuts gave essentially pure ethyl 1,3-dioxolane-2-acetate. The yield was 54%.

*Example 20*

A mixture of ninety-five grams (0.5 mole) of ethyl β,β-diethoxypropionate, sixty-seven grams (0.5 mole) of glycerol α-monoallyl ether, and one gram of sodium hydrogen sulfate was heated in a Claisen flask, at pot temperatures of 110°–180° C., while thirty-six grams of ethanol was distilled therefrom at 77°–81° C. The distillation was continued under reduced pressure. There was obtained fourteen grams of a mixture of ethyl β-ethoxyacrylate, glycerol α-monoallyl ether, and 2-carbethoxymethyl-4-alloxymethyl dioxolane, which distilled at 60°–92 C./0.2 mm. and had a refractive index, $n_D^{20}$, of 1.4510. There was also obtained seventy-four grams of 2-carbethoxymethyl-4-alloxymethyl dioxolane, which distilled at 92°–98° C./0.2 mm. and had a refractive index, $n_D^{20}$, of 1.4500. This may also be termed ethyl 4-alloxymethyl-1,3-dioxolane-2-acetate, having the formula

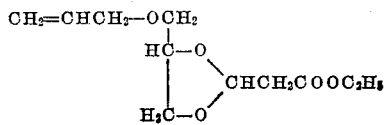

Example 21

A mixture of ninety-five grams (0.5 mole) of ethyl β,β-diethoxypropionate, sixty-seven grams (0.5 mole) of glycerol monoacetate, and one gram of sodium hydrogen sulfate was heated in a Claisen flask at pot temperatures of 110°–170° C. while forty grams of ethanol distilled therefrom at 78°–83° C. The distillation was continued under reduced pressure. There was obtained ten grams of a mixture of glycerol monoacetate, ethyl β-ethoxyacrylate, and 2 - carboethoxymethyl-4-acetoxymethyl dioxolane, which distilled at 57°–95° C./0.1 mm. There was also obtained eighty grams of 2-carboethoxymethyl-4-acetoxymethyl dioxolane, which distilled at 95°–100° C./0.1 mm. The eighty grams represents a yield of 69%. This compound may also be called ethyl 4-acetoxymethyl-1,3-dioxolane-2-acetate.

The reaction between esters of the formula

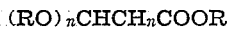

where $n$ is an integer from one to two and R is a hydrocarbon group or a substituted hydrocarbon group free from groups reacting with alkalies, and a polyhydric alcohol having at least two hydroxyl groups separated by two to three carbon atoms,

where $x$ is an integer, particularly from two to six, and R'' is the neutral residue, including hydrocarbon groups and groups having halogen, nitro, ether, hydroxyl, or ester substituents, yields esters of cyclic acetalacetates,

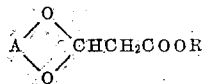

where A corresponds to the groups defined above.

We claim:

1. The process which comprises reacting by heating together in the presence of an acidic catalyst (a) an ester of the formula

wherein $n$ is an integer from one to two and R is a non-tertiary hydrocarbon group, being the residue of a monohydric alcohol, ROH, and (b) a polyhydric alcohol, R''(OH)$_x$, wherein $x$ is an integer from two to six and R'' is the residue thereof containing a saturated chain of two to three carbon atoms between a pair of hydroxyl groups thereof, the said polyhydric alcohol boiling higher than said monohydric alcohol, and removing from the reaction mixture about $n$ moles of the alcohol ROH per mole of said ester.

2. The process which comprises reacting by heating together in the presence of an acidic catalyst (a) an ester of the formula

wherein $n$ is an integer from one to two and R is a non-tertiary hydrocarbon group, being the residue of a monohydric alcohol, ROH, and (b) a glycol, R''(OH)$_2$, wherein R'' is the hydrocarbon residue thereof containing a saturated chain of two to three carbon atoms between the pair of hydroxyl groups thereof, the said glycol boiling higher than the said monohydric alcohol, and removing from the reaction mixture about $n$ moles of the alcohol ROH per mole of said ester.

3. The process which comprises reacting by heating together in the presence of an acidic catalyst between 75° C. and 250° C. (a) an ester of the formula (RO)$_n$CHCH$_n$COOR, wherein $n$ is an integer from one to two and R is a non-tertiary alkyl group of not over four carbon atoms, being the residue of a monohydric alcohol, ROH, and (b) a polyhydric alcohol, R''(OH)$_x$, wherein $x$ is an integer from two to six and R'' is the residue thereof containing a saturated chain of two to three carbon atoms between a pair of hydroxyl groups thereof, and removing from the reaction mixture about $n$ moles of the alcohol ROH per mole of said ester.

4. The process which comprises reacting by heating together in the presence of an acidic catalyst between 75° C. and 250° C. (a) an ester of the formula (RO)$_n$CHCH$_n$COOR, wherein $n$ is an integer from one to two and R is a non-tertiary alkyl group of not over four carbon atoms, being the residue of a monohydric alcohol, ROH, and (b) a glycol, R''(OH)$_2$, wherein R'' is a divalent hydrocarbon group containing a saturated chain of two to three carbon atoms between hydroxyl groups, and removing from the reaction mixture about $n$ moles of the alcohol ROH per mole of said ester.

5. The process which comprises reacting by heating together between 75° C. and 250° C. in the presence of an acidic condensing agent (a) an ester of the formula (RO)$_2$CHCH$_2$COOR, wherein R is a non-tertiary alkyl group of not over four carbon atoms, and (b) a glycol, R''(OH)$_2$, wherein R'' is an alkylene group having a chain of two to three carbon atoms between hydroxyl groups, and removing about two moles of the alcohol ROH per mole of said ester.

6. The process of claim 5 wherein in the ester R is an ethyl group.

7. The process of claim 6 wherein the glycol is ethylene glycol.

8. The process of claim 6 wherein the glycol is trimethylene glycol.

9. The process which comprises reacting by heating together between 75° C. and 250° C. in the presence of an acidic condensing agent (a) an ester of the formula (RO)CH=CHCOOR, wherein R is a non-tertiary alkyl group of not over four carbon atoms, and (b) a glycol, R''(OH)$_2$, wherein R'' is an alkylene group having a chain of two to three carbon atoms between hydroxyl groups, and removing about a mole of the alcohol ROH per mole of said ester.

10. The process of claim 9 wherein R is an ethyl group.

11. The process of claim 9 wherein the glycol is a 1,2-glycol.

12. The process of claim 11 wherein the glycol is ethylene glycol.

WILLARD J. CROXALL.
JOHN O. VAN HOOK.

REFERENCES CITED

The following references are of record in the file of this patent:

UNITED STATES PATENTS

| Number | Name | Date |
| --- | --- | --- |
| 2,447,975 | Croxall et al. | Aug. 24, 1948 |